United States Patent
Moore et al.

(10) Patent No.: US 10,225,359 B2
(45) Date of Patent: Mar. 5, 2019

(54) PUSH NOTIFICATIONS FROM MULTIPLE TENANT SERVERS

(71) Applicant: International Business Machines Corporation, Armonk, NY (US)

(72) Inventors: David P. Moore, Robina (AU); Craig A. Pearson, Varsity Lakes (AU); Shane B. Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 15/272,777

(22) Filed: Sep. 22, 2016

(65) Prior Publication Data
US 2018/0084071 A1    Mar. 22, 2018

(51) Int. Cl.
| | | |
|---|---|---|
| G06F 15/16 | (2006.01) | |
| G06F 15/173 | (2006.01) | |
| H04L 29/08 | (2006.01) | |
| H04L 29/06 | (2006.01) | |
| H04L 12/58 | (2006.01) | |

(52) U.S. Cl.
CPC .............. *H04L 67/26* (2013.01); *H04L 51/24* (2013.01); *H04L 67/42* (2013.01)

(58) Field of Classification Search
USPC ....................................... 709/231, 232, 224
See application file for complete search history.

(56) References Cited

U.S. PATENT DOCUMENTS

| | | | | |
|---|---|---|---|---|
| 7,366,505 | B2 * | 4/2008 | Kasai ................... | H04M 3/533 455/412.1 |
| 8,108,623 | B2 * | 1/2012 | Krishnaprasad .... | G06F 12/0873 711/133 |
| 8,438,294 | B2 * | 5/2013 | Lampell ................ | G06F 9/541 709/227 |
| 8,521,809 | B2 * | 8/2013 | Arnold .................. | H04L 67/04 463/42 |
| 8,583,149 | B2 * | 11/2013 | Vyrros ................... | H04L 51/28 455/466 |
| 8,634,810 | B2 | 1/2014 | Barkie et al. | |
| 8,856,346 | B2 * | 10/2014 | Wills ..................... | H04L 29/06 709/227 |
| 8,874,669 | B2 * | 10/2014 | Bengtsson .......... | H04L 67/1095 709/203 |
| 8,918,529 | B1 * | 12/2014 | Batchu .................. | H04L 63/08 709/229 |
| 8,924,489 | B2 * | 12/2014 | Bleau .................... | H04L 67/26 709/206 |

(Continued)

*Primary Examiner* — Karen C Tang
(74) *Attorney, Agent, or Firm* — Brian M. Restauro

(57) ABSTRACT

An indication is sent to a host server device. The indication includes a request for a push notification service identification (PNSID). The PNSID is used to establish a secure registration between one or more applications on the computing device of a user and the host server device. The PNSID is received from the host server device. An input is received from the user. The input includes one or more application server devices that may send push notifications to the computing device. A unique key is generated for each application server device. The PNSID and a different unique key are sent to each application server device. Each different unique key is associated with a different application server device. A registration is received from each application server device.

17 Claims, 4 Drawing Sheets

(56) References Cited

U.S. PATENT DOCUMENTS

| | | | | |
|---|---|---|---|---|
| 8,933,949 | B2* | 1/2015 | Reeves | G06F 3/1431 |
| | | | | 345/522 |
| 9,037,118 | B2* | 5/2015 | Gaddam | H04W 12/06 |
| | | | | 455/411 |
| 9,148,460 | B1 | 9/2015 | Sun et al. | |
| 9,232,339 | B2 | 1/2016 | Lynes et al. | |
| 9,246,610 | B2* | 1/2016 | Johnson | H04L 12/1845 |
| 9,294,554 | B2* | 3/2016 | Mandel | H04L 67/34 |
| 9,311,646 | B2* | 4/2016 | Irwin | G06Q 30/0185 |
| 9,386,416 | B1* | 7/2016 | Reyes | H04W 4/021 |
| 9,407,767 | B2* | 8/2016 | Jain | H04M 3/5175 |
| 9,582,267 | B2* | 2/2017 | Aabye | G06F 8/65 |
| 9,667,713 | B2* | 5/2017 | Vyrros | H04L 45/745 |
| 9,712,492 | B1* | 7/2017 | Kim | H04L 63/0272 |
| 9,712,632 | B2* | 7/2017 | Chen | H04L 67/26 |
| 9,747,652 | B2* | 8/2017 | Eisenberger | G06Q 10/10 |
| 9,760,877 | B1* | 9/2017 | Daniel | G06Q 20/16 |
| 9,767,124 | B2* | 9/2017 | Kishi | G06F 17/30277 |
| 9,832,623 | B2* | 11/2017 | Liu | H04W 52/0222 |
| 9,854,027 | B2* | 12/2017 | Volkmann | H04L 67/10 |
| 9,898,790 | B2* | 2/2018 | Irwin | G06Q 50/265 |
| 9,942,703 | B2* | 4/2018 | Stevens | H04W 4/02 |
| 2012/0260215 | A1 | 10/2012 | Fennel | |
| 2014/0007213 | A1 | 1/2014 | Sanin et al. | |
| 2014/0164541 | A1 | 6/2014 | Marcellino | |

* cited by examiner

PUSH NOTIFICATIONS FROM MULTIPLE TENANT SERVERS

BACKGROUND

The present invention relates generally to the field of push notifications, and more particularly to receiving secure push notifications from multiple tenant servers.

A push notification is the delivery of a message from a software application provider to a computing device without a specific request from the user of the computing device. An example push notification might be a weather alert sent to a smartphone based solely on the current weather conditions in the area where the smartphone is located. Since there is no request from a user, push notifications originate from the server from which the push notification is sent. An advantage of push notifications is that the technology does not require any specific applications to be open on the computing device in order to receive the push notification. This advantage allows alerts, social media updates, and the like, to be received even when the computing device is locked with no open applications.

SUMMARY OF THE INVENTION

Embodiments of the present invention include a method, computer program product, and system for receiving secure push notifications from multiple tenant servers. In one embodiment, an indication is sent to a host server device. The indication includes a request for a push notification service identification (PNSID). The PNSID is used to establish a secure registration between one or more applications on the computing device of a user and the host server device. The PNSID is received from the host server device. An input is received from the user. The input includes one or more application server devices that may send push notifications to the computing device. A unique key is generated for each application server device. The PNSID and a different unique key are sent to each application server device. Each different unique key is associated with a different application server device. A registration is received from each application server device.

DETAILED DESCRIPTION

Embodiments of the present invention provide for receiving secure push notifications from multiple tenant servers. In a single tenant situation, an application on a computing device establishes a secure registration with a host server for the application and through the secure registration, the host server for the application can push secure notifications to the computing device. The concept of multiple tenants is that a single application on a computing device is hosted by a single server but that single application may receive push notifications from multiple servers (or tenants) based in different locations. While a secure registration may be established with the host server for the application, no secure registration is established with the multiple tenants. Consequently, unsecure push notifications may be received by the smartphone from any of the multiple tenants or from another server imitating one or more of the multiple tenants.

Embodiments of the present invention recognize that there may be a method, computer program product, and computer system for receiving secure push notifications from multiple tenant servers. The method, computer program product, and computer system may use a unique security key to differentiate multiple tenant servers from one another and to determine that a push notification has been received from a legitimate server.

The present invention will now be described in detail with reference to the Figures.

Figure 1:
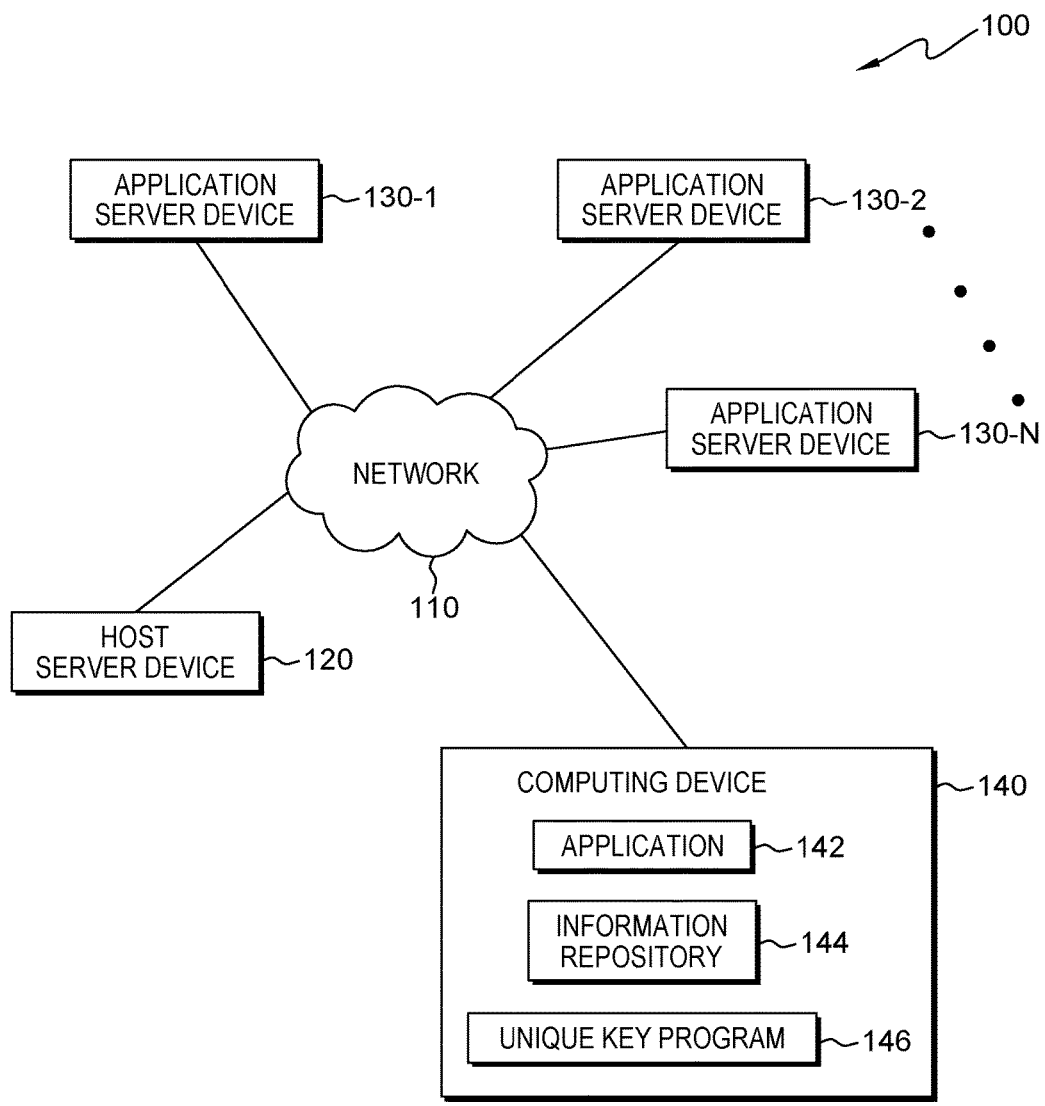
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes host server device 120, application server device 130-1, application server device 130-2, application server device 130-N, and computing device 140 connected to network 110. In example embodiments, computing environment 100 may include other computing devices (not shown) such as smartwatches, cell phones, smartphones, wearable technology, phablets, tablet computers, laptop computers, desktop computers, other computer servers or any other computer system known in the art, interconnected with host server device 120, application server device 130-1, application server device 130-2, application server device 130-N, and computing device 140 over network 110.

In example embodiments, host server device 120, application server device 130-1, application server device 130-2, application server device 130-N, and computing device 140 may connect to network 110, which enables host server device 120, application server device 130-1, application server device 130-2, application server device 130-N, and computing device 140 to access other computing devices and/or data not directly stored on host server device 120, application server device 130-1, application server device 130-2, application server device 130-N, and/or computing device 140. Network 110 may be, for example, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between host server device 120, application server device 130-1, application server device 130-2, application server device 130-N, and computing device 140, and any other computing devices connected to network 110, in accordance with embodiments of the present invention. In an embodiment, data received by another computing device in computing environment 100 (not shown) may be communicated to host server device 120, application server device 130-1, application server device 130-2, application server device 130-N, and computing device 140 via network 110.

In embodiments of the present invention, host server device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, host server device 120 represents a computer system utilizing clustered computers and components (e.g., database server computers, application server computers, etc.) that act as a single pool of seamless resources when accessed by elements of computing environment 100. In general, host server device 120 is representative of any electronic device or combination of electronic devices capable of executing computer readable program instructions. In an embodiment, host server device 120 functions to host and manage mobile application software available for public download. Computing environment 100 may include any number of host server device 120, application server device 130-1, application server device 130-2, application server device 130-N, and computing device 140.

In an embodiment, application server device 130-1, application server device 130-2, application server device 130-N, and computing device 140 are substantially similar to host server device 120. Throughout the document, application server device 130-N will be used to reference the various instances of application server device 130-1, application server device 130-2, and all other instances of application server device 130. In an embodiment, application server device 130-N hosts any number of applications that may interact with host server device 120 and computing device 140. Host server device 120, application server device 130-N, and computing device 140 may include components as depicted and described in further detail with respect to FIG. 4, in accordance with embodiments of the present invention.

According to an embodiment of the present invention, computing device 140 is a computing device such as a smartphone or tablet computer. In an embodiment, computing device 140 includes application 142, information repository 144, and unique key program 146. According to embodiments of the present invention, application 142 may be a program, subprogram of a larger program, application, plurality of applications, or mobile application software that performs a function. A program is a sequence of instructions written by a programmer to perform a specific task. Application 142 may run by itself but may be dependent on system software (not shown) to execute. In one embodiment, application 142 functions as a stand-alone program residing on computing device 140. In another embodiment, application 142 may be included as a part of an operating system (not shown) of computing device 140. In yet another embodiment, application 142 may work in conjunction with other programs, applications, etc., found on computing device 140 or in computing environment 100. In yet another embodiment, application 142 may be found on other computing devices (not shown) in computing environment 100 which are interconnected to computing device 140 via network 110.

According to embodiments of the present invention, information repository 144 may be storage that may be written to and/or read by unique key program 146. In one embodiment, information repository 144 resides on computing device 140. In another embodiment, information repository 144 resides on host server device 120 or application server device 130-N. In other embodiments, information repository 144 may reside on any other device (not shown) in computing environment 100, in cloud storage or on another computing device accessible via network 110. In yet another embodiment, information repository 144 may represent multiple storage devices within host server device 120, application server device 130-N, and/or computing device 140.

In an embodiment, information repository 144 may be implemented using any volatile or non-volatile storage media for storing information, as known in the art. For example, information repository 144 may be implemented with a tape library, optical library, one or more independent hard disk drives, multiple hard disk drives in a redundant array of independent disks (RAID), solid-state drives (SSD), or random-access memory (RAM). Similarly, information repository 144 may be implemented with any suitable storage architecture known in the art, such as a relational database, an object-oriented database, or one or more tables. In an embodiment of the present invention, unique key program 146 and any other programs and applications (not shown) operating on host server device 120 may store, read, modify, or write data to information repository 144. Examples of data stored to information repository 144 include unique keys, also known as security tokens, generated by unique key program 146 used by computing device 140 and application 142 to receive push notifications from any number of application server device 130-N.

According to embodiments of the present invention, unique key program 146 may be a program, a subprogram of a larger program, an application, a plurality of applications, or mobile application software, which functions to generate unique keys, which allows computing device 140 to receive secure push notifications from multiple tenant servers. A program is a sequence of instructions written by a programmer to perform a specific task. Unique key program 146 may run by itself but may be dependent on system software (not shown) to execute. In one embodiment, unique key program 146 functions as a stand-alone program residing on computing device 140. In another embodiment, unique key program 146 may be included as a part of host server device 120. In yet another embodiment, unique key program 146 may work in conjunction with other programs, applications, etc., found on computing device 140 or in computing environment 100. In yet another embodiment, unique key program 146 may be found on other computing devices (not shown) in computing environment 100, which are interconnected to computing device 140 via network 110.

According to embodiments of the present invention, unique key program 146 functions to generate unique keys, which allows computing device 140 to receive secure push notifications from multiple tenant servers. According to an embodiment of the present invention, unique key program 146 requests a push notification service identification (PNSID) from host server device 120, generates one or more unique keys for one or more application server device 130-N, and sends the received PNSID and one of the one or more unique keys to one of the one or more application server device 130-N to complete a registration of the one application server device 130-N which allows computing device 140 to receive secure push notifications from the one application server device 130-N.

Figure 2:
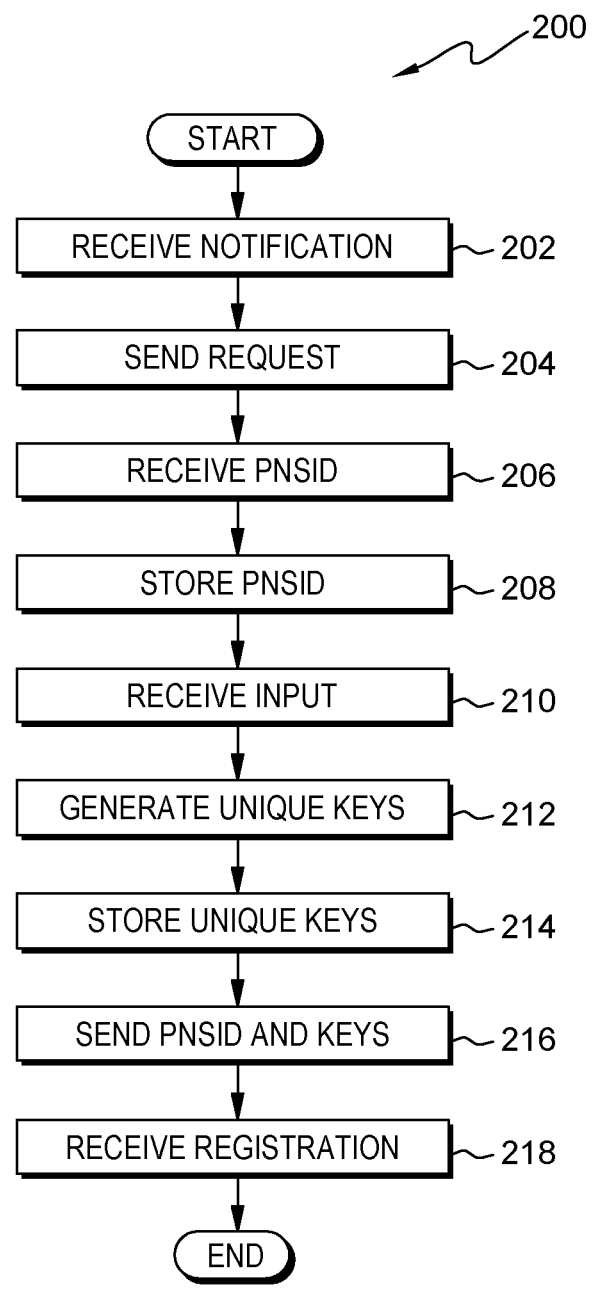
FIG. 2 depicts a flowchart of a program for generating one or more unique keys as part of a registration process of one or more application server devices, in accordance with an embodiment of the present invention.

FIG. 2 is a flowchart of workflow 200 depicting a method for generating one or more unique keys as part of a registration process of one or more application server devices. In one embodiment, the method of workflow 200 is performed by unique key program 146. In an alternative embodiment, the method of workflow 200 may be performed by any other program working with unique key program 146. In an embodiment, a user, via a user interface (not shown), may invoke workflow 200 upon downloading an application to a computing device. In an alternative embodiment, a user may invoke workflow 200 upon accessing unique key program 146.

In an embodiment, unique key program 146 receives a notification (step 202). In other words, unique key program 146 receives a notification from a computing device that a user has installed one or more applications on the computing device. In an embodiment, unique key program 146 receives a notification from computing device 140 that a user has installed application 142 on computing device 140. For example, "Joe" has installed a personal finance application (or app) on a smartphone owned by "Joe".

In an embodiment, unique key program 146 sends a request (step 204). In other words, unique key program 146 sends a request to the server hosting a downloadable variant of the installed one or more applications for a push notification service identification (PNSID). In an embodiment, the downloadable variant of an application is the user version of the application that a user may download and install on the computing device of the user. In an embodiment, a PNSID establishes a secure registration between the computing device, and one or more applications on the computing device, requesting the PNSID and a server hosting the downloadable variant of the one or more applications. According to an embodiment of the present invention, unique key program 146, on computing device 140, sends a request for a PNSID to host server device 120, which is hosting a variant of application 142 available for public downloading. For example, "Joe" requests a PNSID from the server where "Joe" downloaded the personal finance app.

In an embodiment, unique key program 146 receives a PNSID (step 206). In other words, unique key program 146 receives the requested PNSID from the server to which unique key program 146 sent the request. In an embodiment, unique key program 146 receives a PNSID from host server device 120. For example, the smartphone owned by "Joe" receives the PNSID "XYZ" from the server where "Joe" downloaded the personal finance app.

In an embodiment, unique key program 146 stores the PNSID (step 208). In other words, unique key program 146 stores the received PNSID to a repository for later use as needed. In an embodiment, unique key program 146 stores the received PNSID to information repository 144 on computing device 140. For example, "Joe" stores the PNSID "XYZ" to the memory on the smartphone owned by "Joe".

In an embodiment, unique key program 146 receives an input (step 210). In other words, unique key program 146 receives an input from a user that indicates one or more application servers that may send push notifications, based on the one or more installed applications, to the user. In an embodiment, the one or more application server device 130-N may host any number of functions that may interact with application 142 on computing device 140. In an embodiment, unique key program 146 receives an input from a user indicating that application 142 may interact with one or more application server device 130-N. For example, "Joe" indicates that the personal finance app downloaded to the smartphone owned by "Joe" may interact with three different application servers—the first is a server managed by a credit union used by "Joe", the second is a server managed by a discount broker used by "Joe", and the third is a server managed by a fee-only financial planner used by "Joe".

In an embodiment, unique key program 146 generates the unique keys (step 212). In other words, based on the application servers indicated by the user (step 210), unique key program 146 generates unique keys for each indicated application server. In an embodiment, each unique key is specific to only one application server and will be required by the issuing computing device in order to receive push notifications from the specific application server. In an embodiment, unique key program 146 generates a unique key for each application server device 130-N indicated by the user. For example, "Joe" requires three unique keys—unique key "A" for the credit union used by "Joe", unique key "B" for the discount broker used by "Joe", and unique key "C" for the fee-only financial planner used by "Joe".

In an embodiment, unique key program 146 stores the unique keys (step 214). In other words, unique key program 146 stores the one or more generated unique keys to a repository for later use as needed. In an embodiment, unique key program 146 stores the one or more generated unique keys to information repository 144 on computing device 140. For example, "Joe" stores the three generated unique keys to the memory on the smartphone owned by "Joe".

In an embodiment, unique key program 146 sends the PNSID and a unique key (step 216). In other words, unique key program 146 sends the PNSID and one of the one or more unique keys to each application server indicated by the user. In an embodiment, the association between each unique key and the application server each unique key is sent to is saved to information repository 144 by unique key program 146. In an embodiment, unique key program 146 sends the received PNSID and one of the one or more generated unique keys to each of the application server device 130-N indicated by the user. In the embodiment, the PNSID and the unique key specific to application server device 130-N is sent by unique key program 146 to application server device 130-N. For example, "Joe" sends the following: the PNSID "XYZ" and unique key "A" to the credit union used by "Joe", the PNSID "XYZ" and unique key "B" to the discount broker used by "Joe", and the PNSID "XYZ" and unique key "C" to the fee-only financial planner used by "Joe".

In an embodiment, unique key program 146 receives a registration (step 218). In other words, unique key program 146 receives, from each application server device indicated by the user, a registration, which allows push notifications to be sent from each application server device to the computing device that sent the PNSID and the unique key. In an embodiment, unique key program 146 receives a registration from each application server device 130-N that received the PNSID and a unique key. In the embodiment, each application server device 130-N includes the unique key the application server device 130-N received in the registration, which confirms to unique key program 146 that the application server device 130-N is approved to send push notifications to the computing device. According to an embodiment of the present invention, each push notification sent by an application server device 130-N will include the specific unique key sent to the application server device 130-N in the push notification to confirm the registration of the application server device 130-N to unique key program 146 on computing device 140. For example, the smartphone owned by "Joe" receives the following three registrations: a registration from the credit union used by "Joe" (which includes unique key "A"), a registration from the discount broker used by "Joe" (which includes unique key "B"), and a registration from the fee-only personal financial advisor used by "Joe" (which includes unique key "C"). In the example, all push notifications sent by the discount broker used by "Joe" will include unique key "B" which will confirm the registration of the discount broker to the smartphone owned by "Joe" and will allow the push notification from the discount broker to be displayed on the smartphone owned by "Joe". In a similar manner, all push notifications sent from the credit union used by "Joe" will include unique key "A" and all push notification sent from the fee-only financial planner used by "Joe" will include unique key "C".

Figure 3:
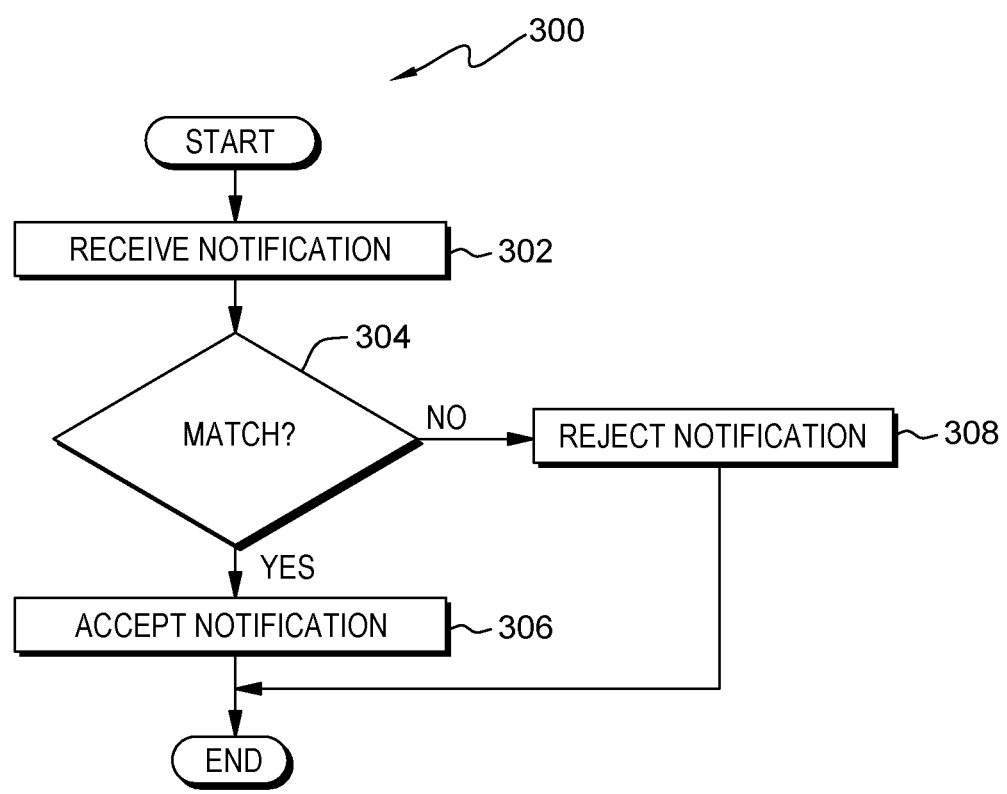
FIG. 3 depicts a flowchart of a program for receiving a push notification, in accordance with an embodiment of the present invention.

FIG. 3 is a flowchart of workflow 300 depicting a method for receiving a push notification. In one embodiment, the method of workflow 300 is performed by unique key program 146. In an alternative embodiment, the method of workflow 300 may be performed by any other program working with unique key program 146. In an embodiment, a user, via a user interface (not shown), may invoke workflow 300 upon receiving a push notification. In an alternative embodiment, a user may invoke workflow 300 upon accessing unique key program 146.

In an embodiment, unique key program 146 receives a notification (step 302). In other words, unique key program 146 receives a notification that a push notification has been received on a computing device. In an embodiment, unique key program 146 on computing device 140 has received a notification that a push notification was received by computing device 140. For example, the smartphone owned by "Joe" receives a push notification from the fee-only financial planner used by "Joe".

In an embodiment, unique key program 146 determines whether a match exists (decision step 304). In other words, unique key program 146 determines whether the key, included in the push notification (i.e. a push notification key) from an application server device, matches the unique key, stored to a repository, which was sent to the application server device by unique key program 146 during the registration process. In an embodiment, the determination is made by comparing the push notification key to the unique key sent to the application server device. In an embodiment (decision step 304, YES branch), the push notification key, included in the push notification from an application server device, does match the unique key, stored to a repository, which was sent to the application server device by unique key program 146 during the registration process; therefore, unique key program 146 proceeds to step 306. In the embodiment (decision step 304, NO branch), the push notification key, included in the push notification from an application server device, does not match the unique key, stored to a repository, which was sent to the application server device by unique key program 146 during the registration process; therefore, unique key program 146 proceeds to step 308.

In an embodiment, unique key program 146 accepts a push notification (step 306). In other words, responsive to determining that the push notification key, included in the push notification from an application server device, does match the unique key, stored to a repository, which was sent to the application server device by unique key program 146 during the registration process, unique key program 146 accepts the push notification. In an embodiment, unique key program 146 on computing device 140 determines that the push notification key and the unique key match and unique key program 146 displays the push notification on computing device 140. For example, the smartphone owned by "Joe" displays the push notification received from the fee-only financial planner used by "Joe".

In an embodiment, unique key program 146 rejects a push notification (step 308). In other words, responsive to determining that the push notification key, included in the push notification from an application server device, does not match the unique key, stored to a repository, which was sent to the application server device by unique key program 146 during the registration process, unique key program 146 rejects the push notification and sends an alert to the computing device that the received push notification was rejected. In an embodiment, unique key program 146 on computing device 140 determines that the push notification key and the unique key do not match and unique key program 146 rejects the push notification on computing device 140 and sends an alert to computing device 140 that the push notification was rejected. For example, the smartphone owned by "Joe" does not display the push notification received from the fee-only financial planner used by "Joe" and the smartphone owned by "Joe" receives an alert that a push notification received from the fee-only financial planner used by "Joe" was rejected.

Figure 4:
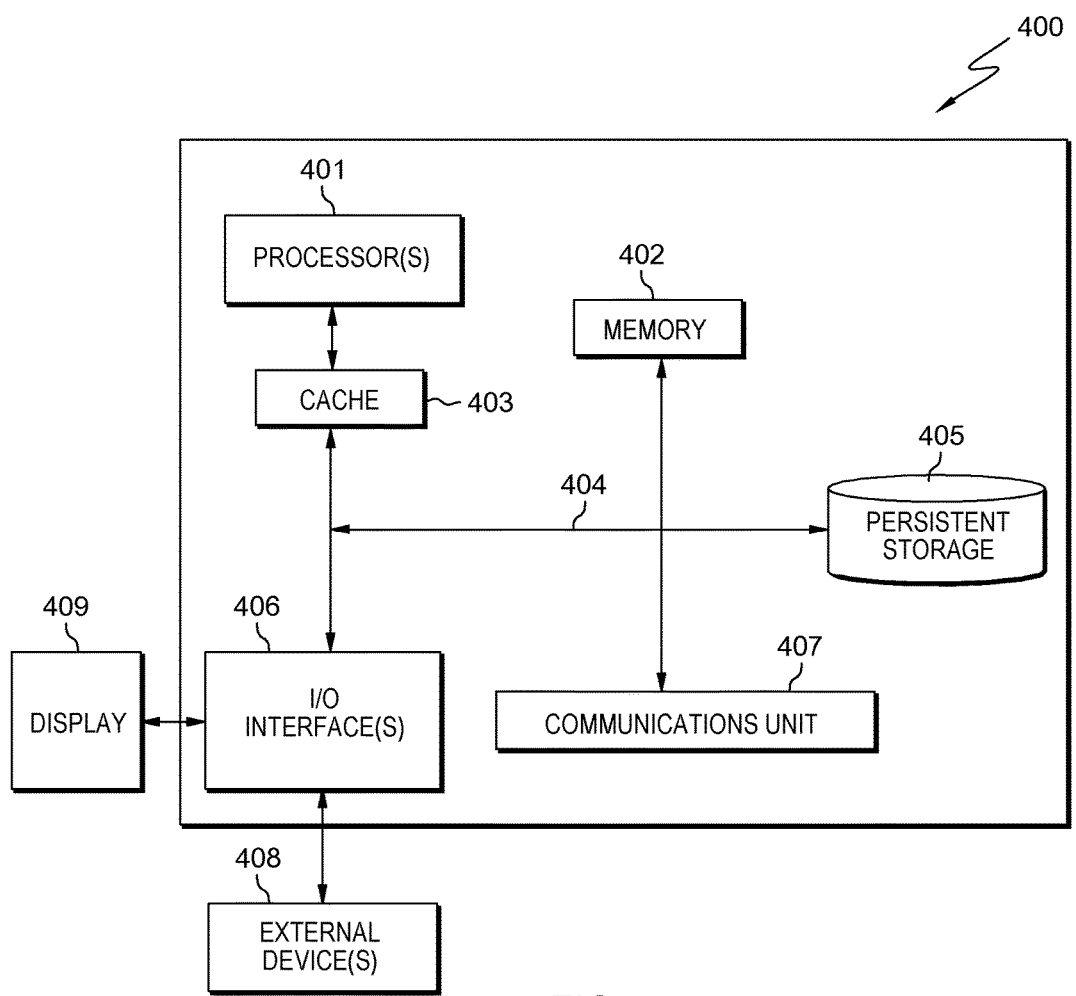
FIG. 4 depicts a block diagram of components of the computing environment of FIG. 1, in accordance with an embodiment of the present invention.

FIG. 4 depicts computer system 400, which is an example of a system that includes unique key program 146. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for receiving secure push notifications from multiple tenant servers, the method comprising:
    sending, by one or more computer processors, an indication, to a host server device, wherein the indication includes a request for a push notification service identification (PNSID), wherein the PNSID is used to establish a secure registration between one or more applications on a computing device of a user and the host server device;
    receiving, by one or more computer processor, the requested PNSID from the host server device;
    receiving, by one or more computer processors, an input from the user, wherein the input includes one or more application server devices that may send one or more push notifications to the computing device of the user;
    generating, by one or more computer processors, a unique key for each application server device of the one or more application server devices;
    sending, by one or more computer processors, the PNSID and a first unique key of the one or more generated unique keys to a first application server device of the one or more application server devices, wherein the first unique key is associated with the first application server device;
    receiving, by one or more computer processors, a push notification that includes a push notification key from the first application server device;
    determining, by one or more computer processors, whether the push notification key matches the first unique key sent to the first application server device; and
    responsive to determining that the push notification key, received from the first application server device, does not match the first unique key sent to the first application server device, rejecting, by one or more computer processors, the received push notification.

2. The method of claim 1, further comprising:
    storing, by one or more computer processors, the received PNSID to an information repository; and
    storing, by one or more computer processors, the generated unique key for each application server device of the one or more application server devices to the information repository.

3. The method of claim 1, further comprising:
    responsive to determining that the push notification key does match the first unique key sent to the first application server device, accepting, by one or more computer processors, the received push notification.

4. The method of claim 1, wherein the determination of whether the push notification key received from the first application server device and the first unique key sent to the first application server device match is determined by comparing the push notification key to the first unique key sent to the first application server device.

5. The method of claim 3, further comprising:
    responsive to accepting the received push notification, displaying, by one or more computer processors, the accepted push notification, wherein the accepted push notification is displayed on the computing device of the user.

6. The method of claim 1, further comprising:
    sending, by one or more computer processors, an alert to the user that the received push notification was rejected.

7. A computer program product for receiving secure push notifications from multiple tenant servers, the computer program product comprising:
    one or more computer readable storage media; and
    program instructions stored on the one or more computer readable storage media, the program instructions comprising:
        program instructions to send an indication, to a host server device, wherein the indication includes a request for a push notification service identification (PNSID), wherein the PNSID is used to establish a secure registration between one or more applications on a computing device of a user and the host server device;
        program instructions to receive the requested PNSID from the host server device;
        program instructions to receive an input from the user, wherein the input includes one or more application server devices that may send one or more push notifications to the computing device of the user;
        program instructions to generate a unique key for each application server device of the one or more application server devices;
        program instructions to send the PNSID and a first unique key of the one or more generated unique keys to a first application server device of the one or more application server devices, wherein the first unique key is associated with the first application server device;
        program instructions to receive a push notification that includes a push notification key from the first application server device;
        program instructions to determine whether the push notification key matches the first unique key sent to the first application server device; and
        program instructions to, responsive to determining that the push notification key, received from the first application server device, does not match the first unique key sent to the first application server device, reject the received push notification.

8. The computer program product of claim 7, further comprising program instructions stored on the one or more computer readable storage media, to:
store the received PNSID to an information repository; and
store the generated unique key for each application server device of the one or more application server devices to the information repository.

9. The computer program product of claim 7, further comprising program instructions stored on the one or more computer readable storage media, to:
responsive to determining that the push notification key does match the first unique key sent to the first application server device, accept the received push notification.

10. The computer program product of claim 7, wherein the determination of whether the push notification key received from the first application server device and the first unique key sent to the first application server device match is determined by comparing the push notification key to the first unique key sent to the first application server device.

11. The computer program product of claim 9, further comprising program instructions stored on the one or more computer readable storage media, to:
responsive to accepting the received push notification, display the accepted push notification, wherein the accepted push notification is displayed on the computing device of the user.

12. The computer program product of claim 7, further comprising program instructions stored on the one or more computer readable storage media, to:
send an alert to the user that the received push notification was rejected.

13. A computer system for receiving secure push notifications from multiple tenant servers, the computer system comprising:
one or more computer processors;
one or more computer readable storage media; and
program instructions stored on the one or more computer readable storage media for execution by at least one of the one or more computer processors, the program instructions comprising:
program instructions to send an indication, to a host server device, wherein the indication includes a request for a push notification service identification (PNSID), wherein the PNSID is used to establish a secure registration between one or more applications on a computing device of a user and the host server device;
program instructions to receive the requested PNSID from the host server device;
program instructions to receive an input from the user, wherein the input includes one or more application server devices that may send one or more push notifications to the computing device of the user;
program instructions to generate a unique key for each application server device of the one or more application server devices;
program instructions to send the PNSID and a first unique key of the one or more generated unique keys to a first application server device of the one or more application server devices, wherein the first unique key is associated with the first application server device;
program instructions to receive a push notification that includes a push notification key from the first application server device;
program instructions to determine whether the push notification key matches the first unique key sent to the first application server device; and
program instructions to, responsive to determining that the push notification key, received from the first application server device, does not match the first unique key sent to the first application server device, reject the received push notification.

14. The computer system of claim 13, further comprising program instructions stored on the one or more computer readable storage media for execution by at least one of the one or more computer processors, to:
store the received PNSID to an information repository; and
store the generated unique key for each application server device of the one or more application server devices to the information repository.

15. The computer system of claim 13, further comprising program instructions stored on the one or more computer readable storage media for execution by at least one of the one or more computer processors, to:
responsive to determining that the push notification key does match the first unique key sent to the first application server device, accept the received push notification.

16. The computer system of claim 13, wherein the determination of whether the push notification key received from the first application server device and the first unique key sent to the first application server device match is determined by comparing the push notification key to the first unique key sent to the first application server device.

17. The computer system of claim 15, further comprising program instructions stored on the one or more computer readable storage media for execution by at least one of the one or more computer processors, to:
responsive to accepting the received push notification, display the accepted push notification, wherein the accepted push notification is displayed on the computing device of the user.

* * * * *